US009619723B1

(12) United States Patent
Chow et al.

(10) Patent No.: US 9,619,723 B1
(45) Date of Patent: Apr. 11, 2017

(54) METHOD AND SYSTEM OF IDENTIFICATION AND AUTHENTICATION USING FACIAL EXPRESSION (71) Applicant: Hong Kong Applied Science and Technology Research Institute Company Limited, Hong Kong (HK)

(72) Inventors: Felix Chow, Hong Kong (HK); Arvin Wai Kai Tang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 0 days.

(21) Appl. No.: 15/045,601

(22) Filed: Feb. 17, 2016

(51) Int. Cl.
*G06K 9/00* (2006.01)
(52) U.S. Cl.
CPC ..... *G06K 9/00906* (2013.01); *G06K 9/00255* (2013.01); *G06K 9/00295* (2013.01); *G06K 9/00315* (2013.01); *G06K 9/00617* (2013.01)
(58) Field of Classification Search
None
See application file for complete search history.

(56) References Cited

U.S. PATENT DOCUMENTS

| | | | |
|---|---|---|---|
| 6,922,478 B1 | 7/2005 | Konen et al. | |
| 7,436,988 B2 | 10/2008 | Zhang et al. | |
| 2013/0044055 A1* | 2/2013 | Karmarkar | G06F 3/013 |
| | | | 345/158 |
| 2013/0101182 A1* | 4/2013 | Frischholz | G06K 9/00899 |
| | | | 382/118 |
| 2014/0376787 A1 | 12/2014 | Hirai | |
| 2015/0095996 A1 | 4/2015 | Tang | |
| 2015/0161434 A1 | 6/2015 | Ross et al. | |

(Continued)

FOREIGN PATENT DOCUMENTS

| | | |
|---|---|---|
| CN | 104246793 A | 12/2014 |
| CN | 104348778 A | 2/2015 |

(Continued)

OTHER PUBLICATIONS

International Search Report and Written Opinion issued for PCT Application No. PCT/CN2016/074107 on Nov. 21, 2016.

*Primary Examiner* — Bernard Krasnic
(74) *Attorney, Agent, or Firm* — Spruson & Ferguson (Hong Kong) Limited (57) ABSTRACT

The present invention employs a first step of stationary face recognition, followed by a facial expression test, a continuous movement tracking test, and a 3D perspective check to identify and authenticate a subject, prevent photo spoofing and facemask spoofing, and determining whether the subject is a living person. The method requires a subject to present her face before a camera, which can be the built-in or peripheral camera of a mobile communication device. The method also requires displaying to the subject certain instructions and the real-time video feedback of the subject face on a display screen, which can be the built-in or peripheral display screen of the mobile communication device or mobile computing device. The 3D perspective check uses a single camera to take two images of the subject's face for the calculating the stereoscopic view data of the subject's face.

6 Claims, 7 Drawing Sheets

(56) References Cited

U.S. PATENT DOCUMENTS

2015/0347734 A1* 12/2015 Beigi .................. G06F 21/32
713/155
2015/0379332 A1* 12/2015 Matsunaga ........ G06K 9/00315
348/77

FOREIGN PATENT DOCUMENTS

| CN | 104751110 A | 7/2015 |
| EP | 1990770 B1 | 8/2012 |
| WO | 2015174647 A1 | 11/2015 |

* cited by examiner

METHOD AND SYSTEM OF IDENTIFICATION AND AUTHENTICATION USING FACIAL EXPRESSION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to face recognition and facial expression analysis. Particularly, the present invention relates to using facial expression for personal identification, authentication, and other security purposes.

BACKGROUND

Face recognition has numerous security-related applications such as user identity matching, user authentication for online and offline resource accesses, door and gate unlocking, and person identification.

Conventionally, face recognition methods use a single captured image of the subject's face to find a match in a library of previously captured facial images. The face matching process is relatively accurate in comparison to other biometric identification methods with well-developed and tested facial feature analysis techniques. In general, the techniques extract feature data of a face region, which is unique for each person, from the captured image of the subject's face, and compares the feature data against those stored in the library, thereby matching the subject's face to that of a previously registered person.

Figure 1A:
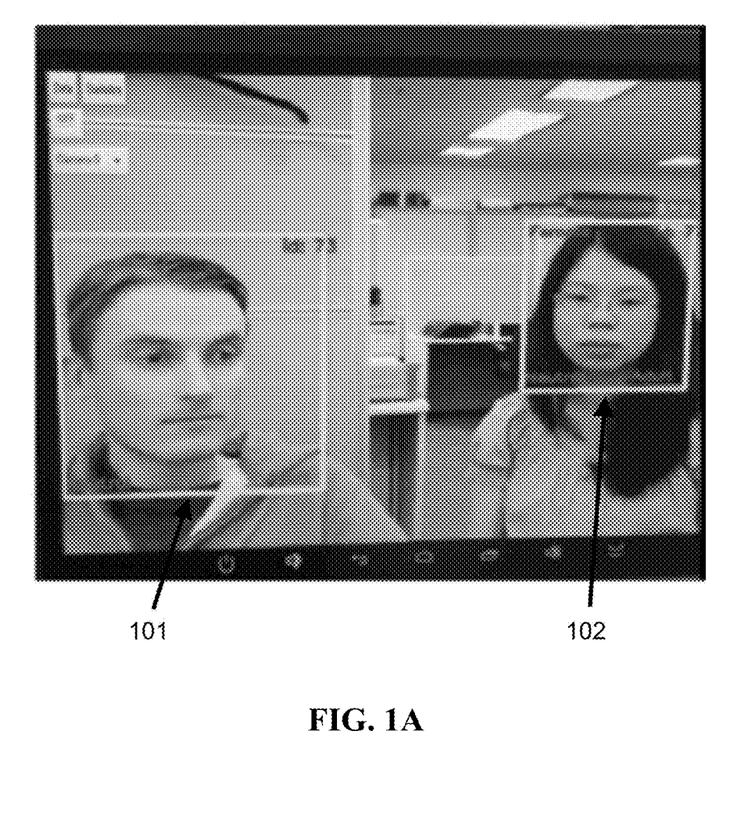
FIG. 1A illustrates an exemplary conventional 2D-based face identification and authentication method.
Figure 1B:
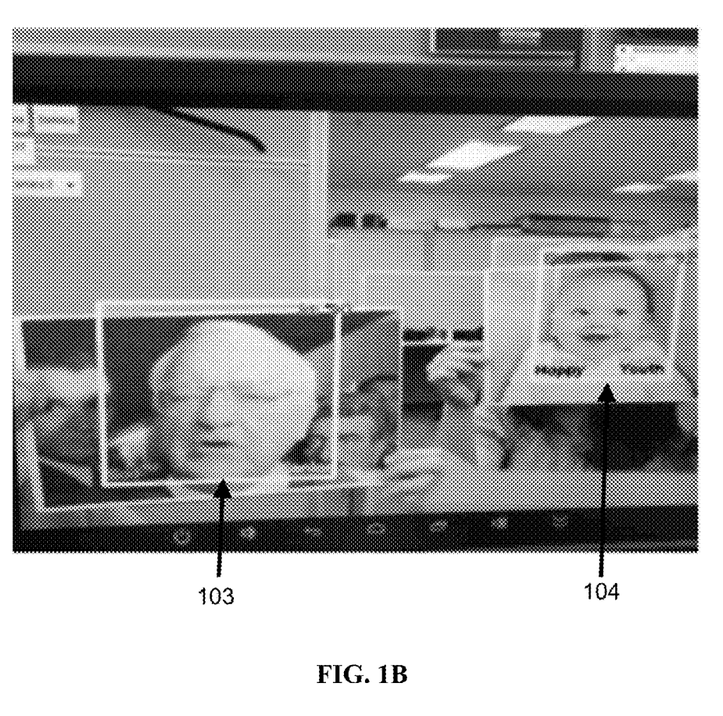
FIG. 1B illustrates an exemplary photo spoofing attempted on the conventional 2D-based face recognition system.

U.S. Pat. No. 6,922,478 discloses one such conventional method for verifying the authenticity of an image recorded in a person identifying process and belonging to a person to be identified. However, one shortcoming of this method is that it maybe deceived by presenting to the system a photograph of another person's face for matching (photo spoofing). In this case, identity theft may not be prevented by two-dimensional (2D) based face recognition systems. FIG. 1A illustrates an exemplary conventional 2D-based face identification and authentication method. In this example, two persons appeared before the camera of a conventional face recognition system, which can be a kiosk or a personal computer. The faces of the two persons (101 and 102) were image-captured and recognized. FIG. 1B illustrates an exemplary photo spoofing being attempted on the conventional face recognition system. In this example, two persons appeared before the camera of the same face recognition system. Each person was holding a photograph (103 or 104) of the face of another person over her own face for being image-captured by the conventional face recognition system. The face recognition system will not be able to distinguish a person's actual face from a photograph of a face.

Improvements have been made with three-dimensional (3D) based face recognition. For example, U.S. Pat. No. 7,436,988 disclosed a method of 3D face recognition, taking a 3D triangular facial mesh as input and extracting the bilateral symmetry plane of the face surface for further analysis. However, even with a 3D based face recognition system, the system may still be deceived by a facemask or a 3D facial sculpture (facemask spoofing). Further, such systems usually require expensive dedicated equipment, such as the 3D scanners as described in U.S. Pat. No. 7,436,988, inhibiting their wide adoption.

Other face recognition systems have been developed to tackle photo spoofing and facemask spoofing by ways of detecting whether the subject is a living person, including requiring the subject to make multiple facial expressions and movements during an identification session and allowing the system to detect and capture the multiple frames of facial expressions and movements for matching. More sophisticated perpetrators of identity theft, however, have devised circumventive measures using series of photographs, electronic displays showing several views of the target's faces, and facemasks capable of projecting different facial expressions.

European Patent No. 1990770 discloses a face authentication apparatus implemented as a user terminal having a built-in camera. Its authentication process includes requiring the user to input a pattern and to make certain eye movements for living body detection. However, the apparatus would necessary employs a rather large display screen in order to place the direction pointers in disparate locations on the display screen for prompting sufficiently large and detectable eye movements. This inhibits its wide adoption, and is likely restricting its implementation to customized user terminals only.

U.S. Patent Application Publication No. 2014/0376787A1 discloses a personal authentication apparatus comprises a face detection unit configured to detect a face region of a person; a facial expression determination unit configured to determine a facial expression from the face region; a storage unit configured to store feature data used to authenticate a person in correspondence with respective facial expressions of a plurality of faces; and a selection unit configured to select feature data corresponding to the facial expression determined by the facial expression determination unit from the storage unit. This personal authentication apparatus employs facial expression analysis in its authentication process, but its design and purpose is to enhance the precision in recognizing and identifying a person's face. It is used to specifically tackle the problem of that the difference between the facial expression of the subject and that upon registration causes precision deterioration of personal authentication. In this case, this personal authentication apparatus would not be able to detect whether the subject is a living person.

SUMMARY

It is an objective of the present invention to provide a method and a system of personal identification and authentication using facial expression that can prevent photo spoofing and facemask spoofing, and capable of effectively detecting whether the subject is a living person. It is a further objective of the present invention to provide such method and system of personal identification and authentication using facial expression that can be implemented in mobile communication devices and compact and low cost mobile computing devices without the need of dedicated 3D scanners, multiple cameras, or special hardware equipment.

In accordance to one embodiment of the present invention, the method of personal identification and authentication using facial expression comprises a first step of stationary face recognition, followed by the process steps of a facial expression test, a continuous movement tracking test, and a 3D perspective check in no particular order. The method requires a subject to present her face before a camera, which can be the built-in or peripheral camera of e.g. a mobile communication device or a mobile computing device. The method also requires displaying to the subject certain instructions and the real-time video feedback of the subject face on a display screen, which can be the built-in or peripheral display screen of the mobile communication device or mobile computing device.

The stationary face recognition step is to first image-capture a subject's face in a single frame shot, then preliminarily verifying the identity of the subject by matching the single frame face image against a database of pre-recorded face data records using existing face analysis and recognition techniques. The subsequent steps are then used to detect photo spoofing and facemask spoofing and ensure the subject is a living person.

In accordance to one embodiment, the facial expression test comprises prompting the subject to make a randomly generated sequence of facial expressions including, but not limited to, neutral, disgusted, happy, angry, surprised, fearful, and sad; and capturing the facial expressions made by the subject. Textual and/or graphical instructions are displayed on the electronic display screen to request the subject to make each of the facial expressions one after another. Each facial expression is either captured in individual single frame shot, or the entire sequence of facial expressions can be video-captured continuously. In the latter case, the video frames containing the facial expressions are extracted in real-time according to their sequence orders and timings for facial expression analysis. The facial expression analysis is to detect false and unnatural facial expressions that usually characterize one wearing a facemask when making such facial expressions. In another embodiment, the face recognition and the facial expression test are performed concurrently.

In accordance to one embodiment, the continuous movement tracking test comprises prompting the subject to make a randomly generated sequence of movements including, but not limited to, moving, within the camera's view plane, her face (or head) towards a particular direction (e.g. laterally left or right, vertically up or down, diagonally, etc.), turning (or rotating) her head towards a particular direction, and blinking her eyes; and capturing the movements made by the subject. Textual and/or graphical instructions are displayed on the electronic display screen to request the subject to make each of the movements one after another. The movements are video-captured continuously for movement detection. The movement detection is to further verify the subject is of a living person and not of rapid swapping different pre-synthesized facial expression photographs in-and-out of the camera's view.

In accordance to one embodiment, the 3D perspective check comprises collecting two or more images of the subject's face, wherein the two or more images can be extracted from the captured images and/or video frames of the previously performed process step of continuous facial movement tracking test; or the two or more images can be captured anew from the subject by prompting the subject with textual and/or graphical instructions displayed on the electronic display screen for the subject to make a movement of her face (or head) from one position to another within the camera's view plane while the two or more images are being taken. The two or more images of the subject's face are then used to calculate the stereoscopic view data of the subject's face. This detects 2D photo spoofing without the need of dedicated 3D scanners, multiple cameras, or special hardware equipment.

BRIEF DESCRIPTION OF THE DRAWINGS

Embodiments of the invention are described in more detail hereinafter with reference to the drawings, in which.

DETAILED DESCRIPTION

In the following description, methods and systems of personal identification and authentication using facial expression and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one embodiment of the present invention, the system of personal identification and authentication using facial expression is implemented in a mobile communication device (e.g. "smartphone" and personal digital assistant), a mobile or personal computing device (e.g. "tablet" computer, laptop computer, and personal computer), a kiosk, or a user terminal having a built-in or peripheral camera and a electronic display screen. The personal identification and authentication system comprises at least machine instructions for rendering and controlling a graphical user interface displayed on the electronic display screen, machine instructions for controlling the camera for capturing images and videos, and machine instructions for performing the face recognition and facial expression analysis, movement tracking, and 3D perspective computational algorithms; wherein the machine instructions can be executed using general purpose or specialized computing devices, computer processors, or electronic circuitries including, but not limited to, digital signal processors (DSP), application specific integrated circuits (ASIC), field programmable gate arrays (FPGA), and other programmable logic devices.

Figure 2:
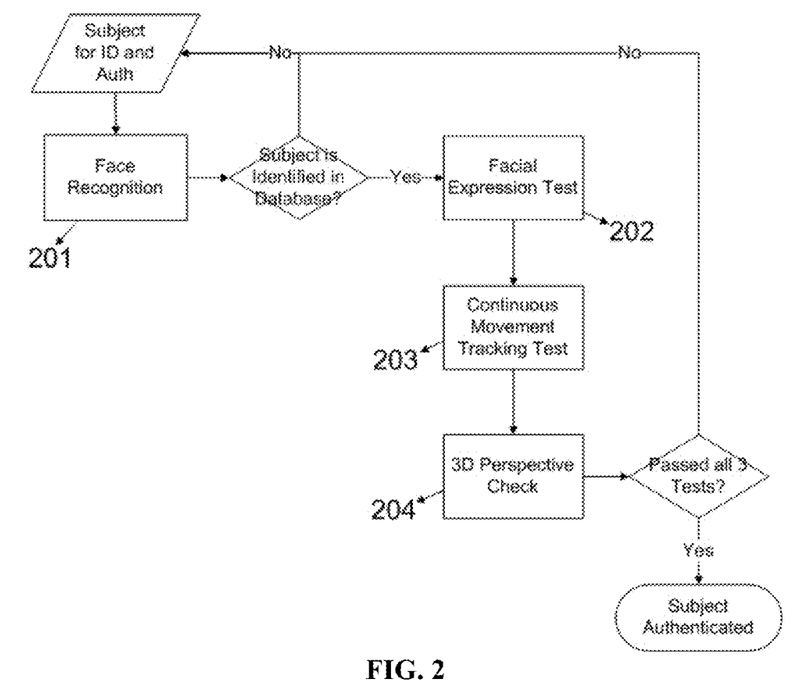
FIG. 2 shows a flowchart of an embodiment of the method of personal identification and authentication using facial expression in accordance to present invention.

Referring to FIG. 2. In accordance to one embodiment of the present invention, the method of personal identification and authentication using facial expression comprises a first step of stationary face recognition 201, followed by the process steps of a facial expression test 202, a continuous movement tracking test 203, and a 3D perspective check 204. Although the steps 202, 203, and 204 are performed in the order as presented in FIG. 2, any other ordering is also possible without departing from the scope of the present invention. The method requires a subject to present her face in the view of the camera of the personal identification and authentication system. The method also requires displaying to the subject certain instructions and the real-time video feedback of the subject face on the display screen of the personal identification and authentication system.

The stationary face recognition step 201 is to first image-capture a subject's face in a single frame shot, then preliminarily verify the captured image is of a human face and the identity of the subject by matching the single frame face image against a database of pre-recorded face data records using existing face analysis and recognition techniques. If the subject's face matches one of the pre-recorded face data records, the subject is identified. The subsequent steps are then used to detect photo spoofing and facemask spoofing and ensure the subject is a living person for further authenticating the subject.

Figure 3:
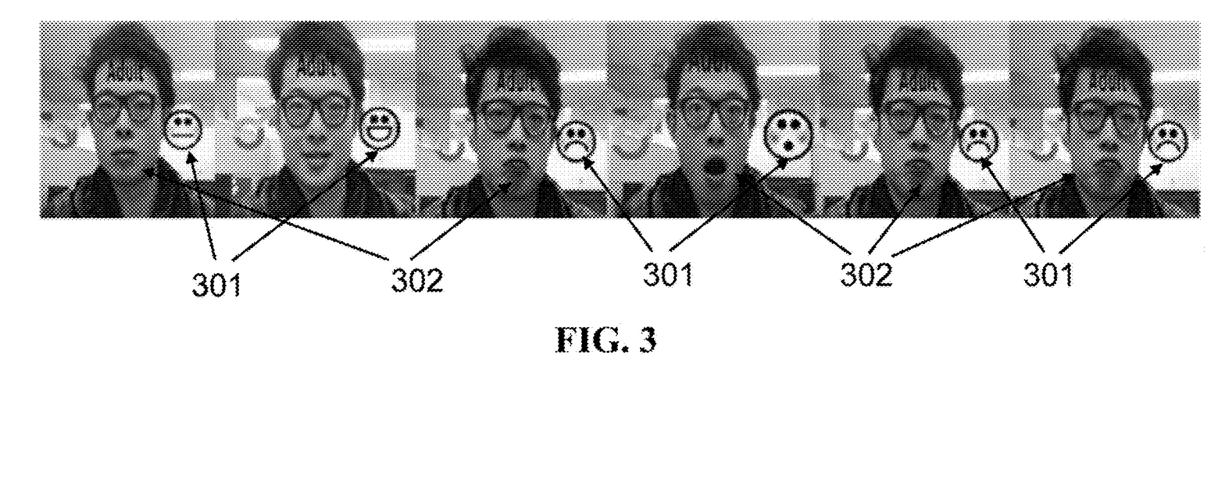
FIG. 3 illustrates an embodiment of the process step of facial expression analysis in accordance to present invention.

Referring to FIG. 2 and FIG. 3. In accordance to one embodiment, the facial expression test 202 comprises prompting the subject to make a randomly generated sequence of facial expressions including, but not limited to, neutral, disgusted, happy, angry, surprised, fearful, and sad; and capturing the facial expressions made by the subject. Textual and/or graphical instructions, such as the graphical icons representing facial expressions (commonly known as "emoticon") 301 as shown in FIG. 3, are displayed on the electronic display screen to request the subject to make each of the facial expressions 302 one after another. Each facial expression 302 is either captured in individual single frame shot, or the entire sequence of facial expressions can be video-captured continuously. In the latter case, the video frames containing the facial expressions 302 are extracted in real-time according to their sequence orders and timings for facial expression analysis. The facial expression analysis is to detect false and unnatural facial expressions that usually characterize one wearing a facemask when making such facial expressions.

In another embodiment, the face recognition 201 and the facial expression test 202 are performed concurrently. In various embodiments, existing facial expression analysis techniques can be employed. Some of these facial expression analysis techniques are based on Facial Action Coding System (FACS), and its details are disclosed in the paper: Ekman et al., *Facial Action Coding System: A Technique for the Measurement of Facial Movement*, Consulting Psychologists Press, 1978, the disclosure of which is incorporated herein by reference in its entirety. Another facial expression analysis technique is disclosed in the paper Zhang et al., *Feature-Based Facial Expression Recognition: Sensitivity Analysis and Experiments With a Multi-Layer Perceptron*, International Journal of Pattern Recognition and Artificial Intelligence 13(6): 893-911, 1999, the disclosure of which is incorporated herein by reference in its entirety.

Figure 4:
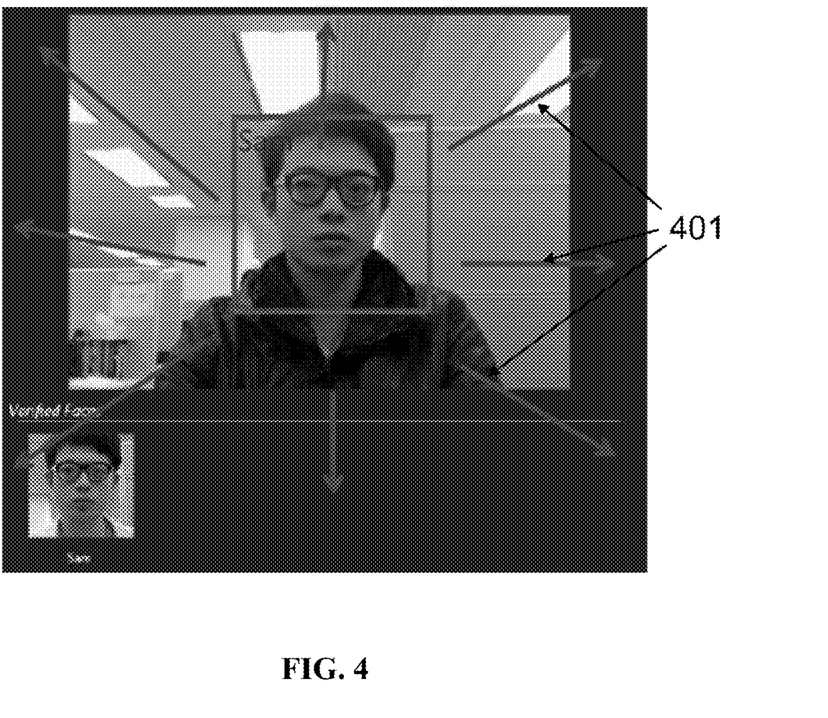
FIG. 4 illustrates an embodiment of the process step of continuous face movement tracking, which is the tracking of head movement, in accordance to present invention.

Referring to FIG. 2 and FIG. 4. In accordance to one embodiment, the continuous movement tracking test 203 comprises prompting the subject to make a randomly generated sequence of movements including, but not limited to, moving, within the camera's view plane, her face (or head) towards a particular direction (e.g. laterally left or right, vertically up or down, diagonally, etc.), and turning (or rotating) her head towards a particular direction; and capturing the movements made by the subject. Textual and/or graphical instructions, such as the arrows 401 as shown in FIG. 4, are displayed on the electronic display screen to request the subject to make each of the movements one after another. The movements are video-captured continuously for movement detection. The movement detection is to further verify the subject is of a living person and not of rapid swapping different pre-synthesized facial expression photographs in-and-out of the camera's view. Therefore, the personal identification and authentication system treats the detection of the face being moved out of the camera's view as an attempt to swap out a pre-synthesized facial expression photograph.

Figure 5:
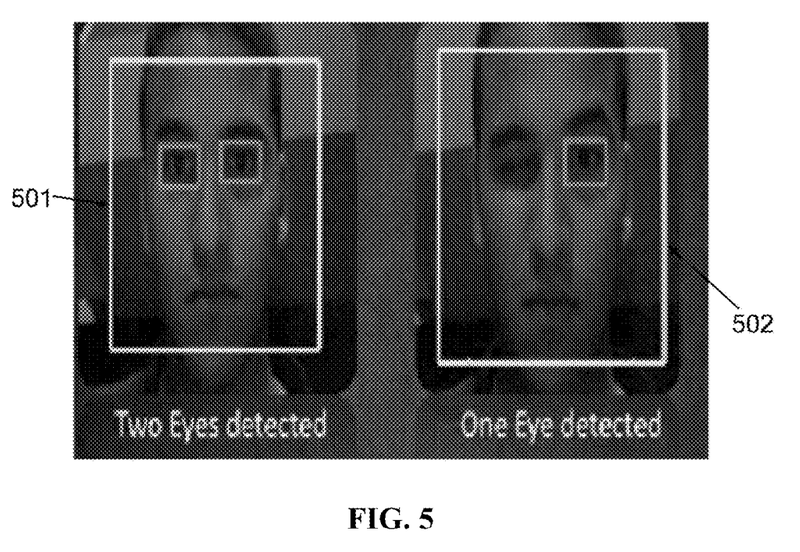
FIG. 5 illustrates another embodiment of the process step of continuous face movement tracking, which is the tracking of eye blinking, in accordance to present invention.

Referring to FIG. 2 and FIG. 5. The continuous movement tracking test 203 can optionally include an eye blinking tracking. In this case, textual and/or graphical instructions are displayed on the electronic display screen to request the subject to make two or more times of blinking of both eyes, blinking of right eye, and blinking of left eye in random order. The personal identification and authentication system tracks the sequence of eye blinking with the expectation of detecting both eyes being open as in 501 and both being shut alternating repeatedly for the blinking of both eyes, both eyes being open as in 501 and right eye being shut as in 502 alternating repeatedly for the blinking of right eye, and both eyes being open as in 501 and left eye being shut alternating repeatedly for the blinking of left eye.

Still referring to FIG. 2. In accordance to one embodiment, the 3D perspective check 204 comprises collecting two or more images of the subject's face, wherein the two or more images can be extracted from the captured images and/or video frames of the previously performed process step of continuous facial movement tracking test; or the two or more images can be captured anew from the subject by prompting the subject with textual and/or graphical instructions displayed on the electronic display screen for the subject to make a movement of her face (or head) from one position to another within the camera's view plane while the two or more images are being taken. The two or more images of the subject's face are then used to calculate the stereoscopic view data of the subject's face. This detects 2D photo spoofing without the need of dedicated 3D scanners or special hardware equipment.

Figure 6:
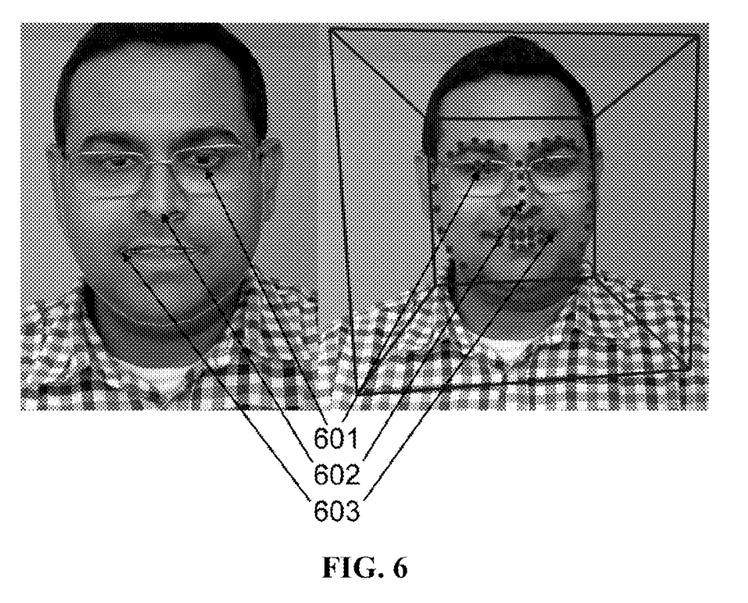
FIG. 6 illustrates one embodiment of the process step of 3D perspective check in accordance to present invention.

Referring to FIG. 6. In one embodiment of the 3D perspective check, two images of the subject's face are used to calculate the 3D points of facial landmarks (e.g. eyes 601, nose 602, and mouth corners 603) in order to determine whether the facial points lie on the same 3D spatial plane. The two images are selected such that they show the face being image-captured at slightly different view angles of the camera due to the movement of the subject's face (or head) from one position to another while two images are being taken. This is comparable to the condition of that two cameras placed at a distance apart image-capturing a stationary subject.

Figure 7:
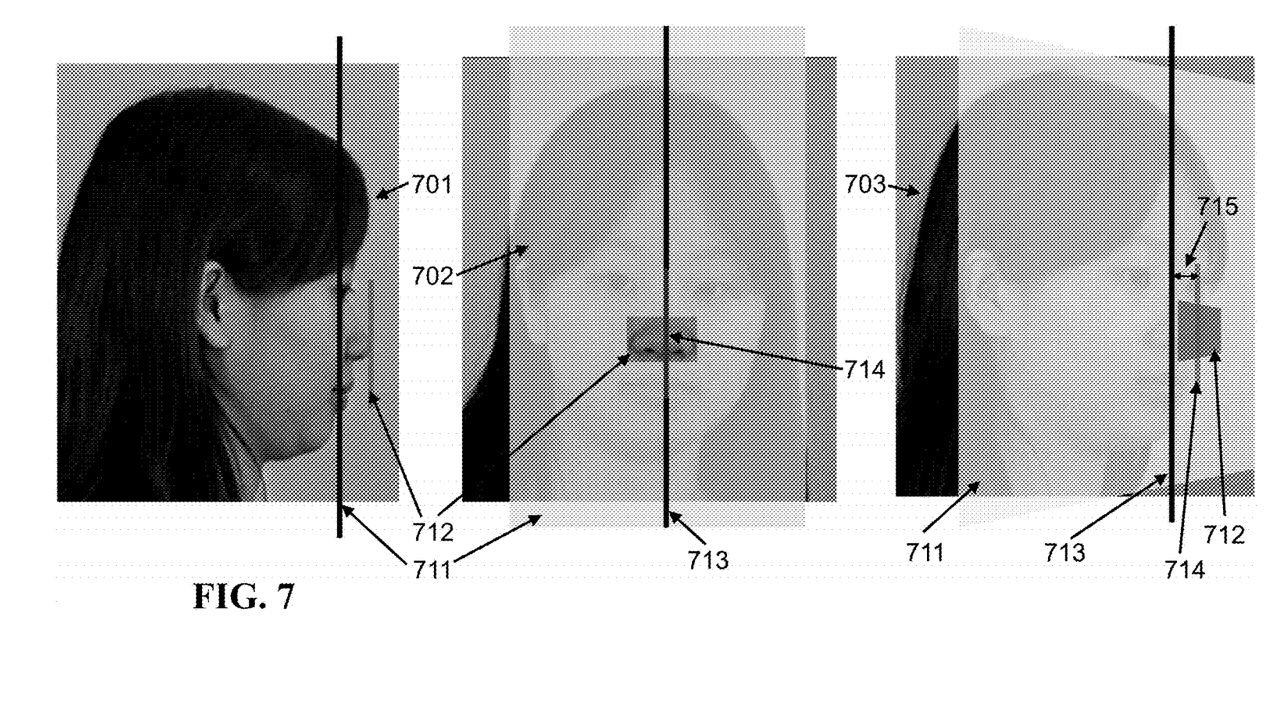
FIG. 7 further illustrates the embodiment of the process step of 3D perspective check in accordance to present invention.

FIG. 7 further elaborates the 3D perspective check. As shown by a 90-degree view 701 of the subject's face, the eyes and mouth are usually lying on the same 3D spatial plane 711, whereas the nose, especially the tip of the nose, is usually lying on a different 3D spatial plane 712. The facial landmarks lying on different 3D spatial planes are then used to estimate their respective 2D planes. On a frontal view 702 of the subject's face, the centerline 713 of the 2D plane of 3D spatial plane 711 and the centerline 714 of the 2D plane of 3D spatial plane 712 are overlapped, thus a first 2D distance between the centerline 713 and centerline 714 is zero. However, on a turned-head view 703 of the subject's face, a second 2D distance 715 between the centerline 713 and centerline 714 is larger than zero. The difference between the first 2D distance and the second 2D distance is directly related to the relative displacement of the movement of the subject's face from one position to another within the camera's view, and the relative displacement is measurable if the subject's face is not planar (e.g. as shown in a photograph).

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for personal identification and authentication using face recognition and facial expression analysis comprising:
    conducting a stationary face recognition of a subject by a device for personal identification and authentication, wherein the device comprises one or more computer processors, a camera, and a display screen, wherein the stationary face recognition comprising:
        image-capturing the subject's face in a first captured image and verifying the first captured image is of a human face and identity of the subject by matching the first captured image against a database of pre-recorded face data records;
    conducting a facial expression test on the subject by the device, the facial expression test comprising:
        generating a random sequence of different facial expression requirements; and
        video-capturing the subject's facial expressions and analyzing the subject's facial expressions and comparing them against the generated facial expression requirements;
    conducting a continuous movement tracking test on the subject by the device, the continuous movement tracking test comprising:
        generating a random sequence of different movement requirements; and
        video-capturing the subject's movements and analyzing the subject's movements and comparing them against the generated movement requirements; and
    conducting a three-dimensional perspective check on the subject by the device, the three-dimensional perspective check comprising:
        obtaining two three-dimensional-perspective-check images of the subject's face at two different locations with respect to the device;
        locating two sets of facial landmarks in a first of the two three-dimensional-perspective-check images, wherein the two sets of facial landmarks lying on two different three-dimensional spatial planes in the first of the two three-dimensional-perspective-check images;
        locating the same two sets of facial landmarks in a second of the two three-dimensional-perspective-check images;
        estimating a three-dimensional spatial plane for each of the two sets of facial landmarks in the second of the two three-dimensional-perspective-check images; and
        calculating a relative displacement between the two three-dimensional spatial planes in the two three-dimensional-perspective-check images for determining the three-dimensional perspective check result.

2. The method of claim 1, wherein the continuous movement tracking test further comprising an eye blinking tracking, the eye blinking tracking comprising:
    generating a random sequence of requirements of gestures of blinking of both eyes, blinking of right eye, and blinking of left eye; and
    video-capturing the subject's eye blinking gestures and analyzing the eye blinking gestures and comparing them against the generated requirements of gestures of blinking.

3. The method of claim 1, wherein the device for personal identification and authentication being a mobile communication device.

4. An apparatus for personal identification and authentication using face recognition and facial expression analysis comprising: one or more computer processors, a camera, and a display screen;
    wherein the apparatus for personal identification and authentication being configured to:
    conduct a stationary face recognition of a subject, the stationary face recognition comprising:
        image-capturing, by the camera, the subject's face in a first captured image and verifying, by the one or more computer processors, the first captured image is of a human face and identity of the subject by matching the first captured image against a database of pre-recorded face data records;
    conduct a facial expression test on the subject, the facial expression test comprising:
        generating, by the one or more computer processors, a random sequence of different facial expression requirements;
        displaying, by the display screen, the random sequence of different facial expression requirements, and
        video-capturing, by the camera, the subject's facial expressions and analyzing, by the one or more computer processors, the subject's facial expressions and comparing them against the generated facial expression requirements;

conduct a continuous movement tracking test on the subject, the continuous movement tracking test comprising:

generating, by the one or more computer processors, a random sequence of different movement requirements;

displaying, by the display screen, the random sequence of different movement requirements, and     video-capturing, by the camera, the subject's movements and analyzing, by the one or more computer processors, the subject's movements and comparing them against the generated movement requirements; and conduct a three-dimensional perspective check on the subject, the three-dimensional perspective check comprising:

obtaining two three-dimensional-perspective-check images of the subject's face at two different locations with respect to the apparatus;

locating, by the one or more computer processors, two sets of facial landmarks in a first of the two three-dimensional-perspective-check images, wherein the two sets of facial landmarks lying on two different three-dimensional spatial planes in the first of the two three-dimensional-perspective-check images;

locating, by the one or more computer processors, the same two sets of facial landmarks in a second of the two three-dimensional-perspective-check images;

estimating, by the one or more computer processors, a three-dimensional spatial plane for each of the two sets of facial landmarks in the second of the two three-dimensional-perspective-check images; and     calculating, by the one or more computer processors, a relative displacement between the two three-dimensional spatial planes in the two three-dimensional-perspective-check images for determining the three-dimensional perspective check result.

5. The apparatus of claim 4, wherein the continuous movement tracking test further comprising an eye blinking tracking, the eye blinking tracking comprising:

generating, by the one or more computer processors, a random sequence of requirements of gestures of blinking of both eyes, blinking of right eye, and blinking of left eye; and     displaying, by the display screen, the random sequence of requirements of gestures of blinking of both eyes, blinking of right eye, and blinking of left eye, and     video-capturing, by the camera, the subject's eye blinking gestures and analyzing, by the one or more computer processors, the eye blinking gestures and comparing them against the generated requirements of gestures of blinking.

6. The apparatus of claim 4, wherein the apparatus being a mobile communication device.

\* \* \* \* \*